(12) United States Patent
Paek et al.

(10) Patent No.: US 6,233,386 B1
(45) Date of Patent: May 15, 2001

(54) OPTICAL FIBER FOR USE IN BRAGG GRATING AND FIBER BRAGG GRATING USING THE SAME

(75) Inventors: Un-chul Paek, Kwangju; Kyung-hwan Oh, Seoul, both of (KR)

(73) Assignee: SamSung Electronica Co., Ltd., Suwon (KR)

( * ) Notice: Subject to any disclaimer, the term of this patent is extended or adjusted under 35 U.S.C. 154(b) by 0 days.

(21) Appl. No.: 09/337,417

(22) Filed: Jun. 22, 1999

(30) Foreign Application Priority Data

Jun. 24, 1998 (KR) .................................. 98-23922

(51) Int. Cl.⁷ ...................................... G02B 6/02
(52) U.S. Cl. .................... 385/123; 385/126; 385/127; 385/141; 385/142; 385/144; 385/37
(58) Field of Search ............................. 385/37, 123, 124, 385/125, 126, 127, 128, 141, 142, 144

(56) References Cited

U.S. PATENT DOCUMENTS

| | | | |
|---|---|---|---|
| 4,264,131 | 4/1981 | Sawamura et al. | 385/141 X |
| 4,616,901 | 10/1986 | MacChesney et al. | 385/123 X |
| 5,042,898 | * 8/1991 | Morey et al. | 385/37 |
| 5,241,615 | * 8/1993 | Amos et al. | 385/126 |
| 5,694,503 | 12/1997 | Fleming et al. | 385/37 |
| 5,755,850 | 5/1998 | Martin et al. | 65/387 |
| 5,829,445 | 11/1998 | Martin et al. | 65/387 |
| 5,868,734 | 2/1999 | Soufiane et al. | 606/15 |
| 6,044,189 | * 3/2000 | Miller | 385/37 |
| 6,067,392 | * 5/2000 | Wakami et al. | 385/37 |

FOREIGN PATENT DOCUMENTS

| | | | |
|---|---|---|---|
| 2 065 633 | 7/1981 | (GB) | 385/126 X |
| 57-11836 | 1/1982 | (JP) | 385/141 X |
| 57-170835 | 10/1982 | (JP) | 385/141 X |
| 3-113404 | 5/1991 | (JP) | 385/141 X |
| 3-113405 | 5/1991 | (JP) | 385/141 X |

* cited by examiner

*Primary Examiner*—Brian Healy
(74) *Attorney, Agent, or Firm*—Robert E. Bushnell, Esq.

(57) ABSTRACT

An optical fiber for use in a fiber Bragg grating and a fiber Bragg grating using the same are provided. The optical fiber includes a core made of a material obtained by adding germanium oxide ($GeO_2$) to silica ($SiO_2$), for guiding light, and a cladding made by adding a material having a negative thermal expansion coefficient to silica ($SiO_2$), the cladding having a refractive index lower than that of the core. Therefore, the change in Bragg wavelength depending on temperature can be minimized by forming the optical fiber using a material having a negative thermal expansion coefficient.

22 Claims, 2 Drawing Sheets

OPTICAL FIBER FOR USE IN BRAGG GRATING AND FIBER BRAGG GRATING USING THE SAME

CLAIM OF PRIORITY

This application makes reference to, incorporates the same herein, and claims all benefits accruing under 35 U.S.C. §119 from my application OPTICAL FIBER FOR USE IN BRAGG GRATING AND FIBER BRAGG GRATING USING THE SAME filed with the Korean Industrial Property Office on Jun. 24, 1998 and there duly assigned Ser. No. 23922/1998.

BACKGROUND OF THE INVENTION

1. Field of the Invention

The present invention relates to an optical fiber for a fiber Bragg grating, and more particularly, to an optical fiber for use in an optical waveguide type Bragg grating, in which a diffraction grating is formed within the optical fiber or the optical waveguide, and a fiber Bragg grating using the same.

2. Description of the Related Art

There are various kinds of diffraction gratings for optical devices. However, in the case of a diffraction grating for use in an optical communications system, it is suitable to use an optical waveguide type diffraction grating which is easily connected to an optical waveguide and has a low insertion loss. A conventional optical waveguide type diffraction grating is fabricated by ultraviolet ray irradiation of a quartz-based optical fiber having a high-refractive index core doped with germanium oxide ($GeO_2$) to cause a periodic change in the refractive index of the core.

However, in the diffraction grating obtained by the above conventional method, the pattern spacing of the refractive index changes is affected by thermal expansion. Also, since the effective refractive index changes according to temperature, the reflection wavelength (to be referred to as a "Bragg wavelength") changes with changes in the ambient temperature of the location at which the diffraction grating is installed.

Examples of optical fibers and optical fiber gratings of the conventional art are seen in the following U.S. Patents. U.S. Pat. No. 5,755,850, to Martin et al., entitled METHOD OF MAKING A SURGICAL LASER FIBER FROM A MONOLITHIC SILICA TITANIA GLASS ROD, and U.S. Pat. No. 5,829,445, to Martin et al, entitled METHODS FOR LASER TREATMENT OF TISSUE, describe an optical fiber using an ultra-low expansion material for use in surgical laser systems. The ultra-low expansion material consists of a silicon dioxide core doped with titanium dioxide which is cladded and jacketed for chemical and abrasion resistance. These patents do not deal, however, with aspects of optical fiber gratings.

U.S. Pat. No. 4,616,901, to MacChesney et al., entitled DOPED OPTICAL FIBER, discusses optical fibers in which the core is doped with nonglass forming refractory oxides including zirconia. The thermal expansion properties and use of such fibers in optical gratings are not discussed, however.

U.S. Pat. No. 5,868,734, to Soufiane et al., entitled METHODS OF USING SILICA-TITANIA CLAD FIBERS, discusses an optical fiber with a silica-titania glass cladding. The silica-titania glass provides a relatively low thermal expansion coefficient apparently providing protection for the fiber, but the patent does not discuss use in optical gratings.

U.S. Pat. No. 5,694,503, to Fleming et al., entitled ARTICLE COMPRISING A TEMPERATURE COMPENSATED OPTICAL FIBER REFRACTIVE INDEX GRATING, describes an optical fiber grating attached to a support member with a negative coefficient of expansion. The negative coefficient expansion substrate is external to the fiber, and is composed of a material such as zirconium tungstate. This invention thus requires device external to the fiber to achieve temperature compensation.

Based on our reading of the art, then, we have decided that what is needed is a Bragg optical fiber grating in which the Bragg wavelength is not seriously affected by temperature.

SUMMARY OF THE INVENTION

It is therefore an object of the invention to provide an improved optical fiber.

It is also an object of the present invention to provide an improved Bragg optical fiber grating.

It is a further object of the invention to provide a Bragg optical fiber grating in which the Bragg wavelength is less sensitive to ambient temperature changes.

It is a yet further object of the invention to provide a Bragg optical fiber grating not requiring an external device for temperature compensation.

Accordingly, to achieve the objectives of the invention, there is provided an optical fiber including a core made of a material obtained by adding germanium oxide ($GeO_2$) to silica ($SiO_2$), for guiding light, and a cladding made by adding a material having a negative thermal expansion coefficient to silica ($SiO_2$), the cladding having a refractive index lower than that of the core, and the material added to the cladding is preferably zirconium oxide ($ZrO_2$).

According to another aspect of the present invention, there is provided an optical fiber for use in a fiber Bragg grating, including: a core made of a material obtained by adding germanium oxide ($GeO_2$) to silica ($SiO_2$), for guiding light, an inner cladding containing at least silica ($SiO_2$), and having a refractive index lower than that of the core, and an outer cladding made by adding a material having a negative thermal expansion coefficient to silica ($SiO_2$), the outer cladding surrounding the inner cladding, and the material added to the cladding is preferably zirconium oxide ($ZrO_2$).

To achieve the second objective, there is provided a fiber Bragg grating, including a core made of a material obtained by adding germanium oxide ($GeO_2$) to silica ($SiO_2$), for guiding light, and a cladding made by adding a material having a negative thermal expansion coefficient to silica ($SiO_2$), the cladding having a refractive index lower than that of the core, wherein a Bragg grating region having a plurality of refractive index changing portions along the optical axis is provided within the core. Here, the material added to the cladding is preferably zirconium oxide ($ZrO_2$).

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
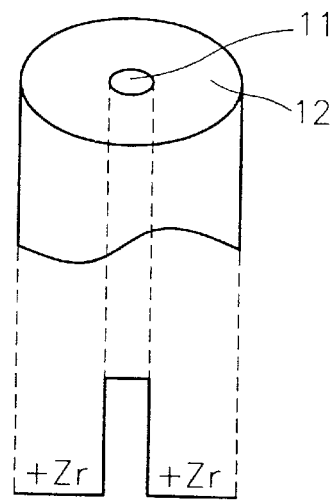
FIGS. 1 and 2 illustrate the physical structure and profile of the refractive index of an optical fiber for use in a diffraction grating using $TiO_2$.
Figure 2:
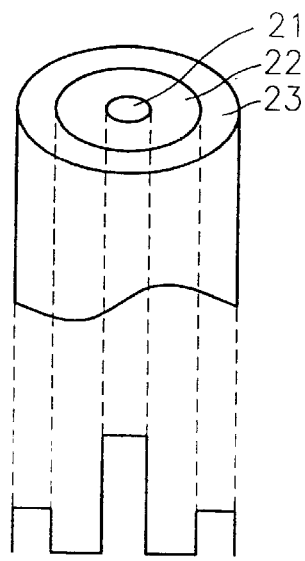

The present invention will now be described in detail with reference to the accompanying drawings. FIGS. 1 and 2 illustrate optical fibers which can be used in fabricating a fiber Bragg grating, in which the upper portions illustrate the physical structures of the optical fibers, and the lower portions illustrate the profiles of the refractive indices of the optical fibers, respectively.

The optical fiber shown in FIG. 1 is comprised of a core 11 and a cladding 12. Here, in order to guide light through the core 11, the refractive index of the core 11 must be higher than that of the cladding 12. The optical fiber shown in FIG. 2 is comprised of a core 21, an inner cladding 22 and an outer cladding 23. In order to guide light through the core 21, the refractive index of the core 21 must be higher than that of the inner cladding 22.

In the structure of the optical fiber shown in FIG. 1, the core 11 is made of $GeO_2$ and $SiO_2$, and the cladding 12 is made of $TiO_2$ or $ZrO_2$, and $SiO_2$. In the structure of the optical fiber shown in FIG. 2, the core 21 is made of $GeO_2$ and $SiO_2$, the inner cladding 22 is made of $SiO_2$, and the outer cladding 23 is made of $SiO_2$ and $TiO_2$ or $ZrO_2$.

In more detail, in FIG. 1, the core 11 is formed such that $GeO_2$ is doped into $SiO_2$. The cladding 12 has a refractive index lower than that of the core 11 and is formed such that $TiO_2$ or $ZrO_2$ is included in $SiO_2$. In FIG. 2 illustrating a double-cladding optical fiber, the core 21 is formed such that $GeO_2$ is included in $SiO_2$. The inner cladding 22 has a refractive index lower than that of the core 21 and is formed to include at least $SiO_2$. The outer cladding 23 has a refractive index lower than that of the core 21 and is formed such that at least $TiO_2$ or $ZrO_2$ is included in $SiO_2$. The outer cladding 23 may be formed such that B and F is further included in $SiO_2$.

An optical fiber for use in a fiber Bragg grating is sensitive to temperature. The refractive index of a core formed in the optical fiber is also sensitive to temperature. The period, that is, pattern spacing, of the grating written in the core increases or decreases according to temperature. That is to say, the thermal expansion coefficient of the core changes according to temperature. In detail, the Bragg wavelength ($\lambda_B$) is described by the effective refractive index (n) of the core, and the spacing ($\Lambda$) of the changing period of the refractive index of the diffraction grating, as expressed by equation (1):

$$\lambda_B = 2n\Lambda \qquad (1)$$

Also, the formula (1) may be differentiated with respect to temperature (T) to obtain the variation of the Bragg wavelength ($\lambda_B$) with respect to temperature, which is expressed by equation (2) or (3):

$$\partial \lambda_B / \partial T = 2\left(\Lambda \cdot \frac{\partial n}{\partial T} + n \cdot \frac{\partial \Lambda}{\partial T}\right) \qquad (2)$$

-continued
$$\partial \lambda_B / \lambda_B m = \frac{1}{\Lambda} \cdot \frac{\partial \Lambda}{\partial T} \cdot \Delta T + \frac{1}{n} \cdot \frac{\partial n}{\partial T} \cdot \Delta T \qquad (3)$$
$$\alpha + \zeta) \cdot \Delta T$$
$$\frac{\lambda_B}{T} = (z\alpha + \zeta) \cdot \lambda_B$$

where n is the effective refractive index of the core, $\Lambda$ is the spacing length of the changing period of the refractive index of the diffraction grating, $\Delta T$ is the variation of temperature, $\alpha$ is the thermal expansion coefficient $$\left(\text{equal to } \frac{\partial \Lambda}{\partial T}\right),$$

and $\zeta$ is the temperature coefficient $$\left(\text{equal to } \frac{\partial n}{\partial T}\right)$$

of the refractive index of the core.

For example, assuming that the variation of the Bragg wavelength with respect to temperature is 0.0113 nm/° C., when the ambient temperature is in a range between −20° C. and 60° C., that is, $\Delta T=80°$ C., the maximum variation of the Bragg wavelength is 0.9 nm.

According to the present invention, it is possible to compensate for the change in the Bragg wavelength of an optical fiber within the optical fiber itself, without using an external device, so that the Bragg wavelength of the optical fiber does not change with changes in temperature. In other words, it is most desirable for the variation of the Bragg wavelength with temperature, expressed by formula (2), to be zero. However, in formula (2), the value of $\partial n/\partial T$ is a positive constant, and the value of $\partial \Lambda/\partial T$ which is a determining factor of the thermal expansion coefficient, varies according to the kind of materials used in forming the core. Therefore, the variation of the Bragg wavelength with respect to temperature can be minimized by forming a cladding using a material having a negative thermal expansion coefficient.

Figure 3:
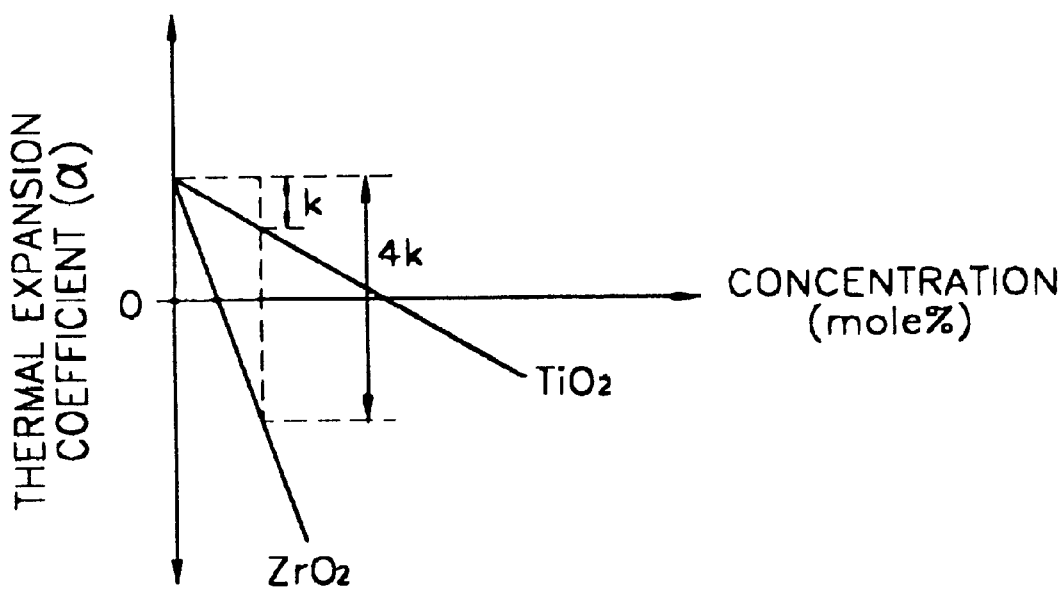
FIG. 3 illustrates the change in thermal expansion coefficients with respect to the concentrations of $TiO_2$ and $ZrO_2$.

Materials having a negative thermal expansion coefficient include $TiO_2$ and $ZrO_2$. The changes in thermal expansion coefficients ($\alpha$) of doped $SiO_2$ with respect to concentrations of $TiO_2$ and $ZrO_2$, in mole %, are illustrated in FIG. 3. Referring to FIG. 3, the changes in thermal expansion coefficients of $TiO_2$ and $ZrO_2$-doped silica are both negative values, and the magnitude of the change with $ZrO_2$ is about four times of that of $TiO_2$ (k) at the same concentration level. Therefore, an optical fiber having $ZrO_2$, rather than $TiO_2$, can provide a fiber Bragg grating which is far less sensitive to temperature and is more reliable.

Figure 4:
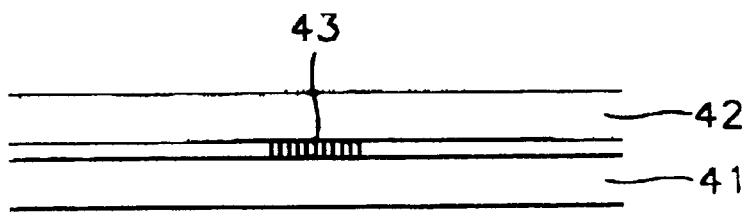
FIG. 4 illustrates a fiber Bragg grating fabricated by irradiating UV rays on a portion where an optical fiber grating is to be generated.

A UV ray is irradiated on portions of the optical fibers shown in FIGS. 1 and 2, where a grating is to be formed, thereby fabricating a fiber Bragg grating as shown in FIG. 4. Further, the fiber Bragg grating may be applicable to optical devices or components such as a coupler, a reflection filter, a Febry-Perot filter and so on.

According to the present invention, when fabricating an optical fiber to be used in forming a fiber Bragg grating, the optical fiber is formed using a material having a negative thermal expansion coefficient, thereby minimizing the change in Bragg wavelength depending on temperature. Therefore, it is possible to attain a fiber Bragg grating showing little change in Bragg wavelength with respect to a change in the ambient temperature in the environment in which the fiber Bragg grating is installed and a change in the temperature of the grating itself, thereby enhancing the reliability of the fiber Bragg grating in WDM (wavelength division multiplexing) communication and so on.

What is claimed is:

1. An optical fiber, comprising:

a core comprising $GeO_2$—$SiO_2$, for guiding light; and a cladding surrounding the core and having a value of refractive index lower than that of the core, said cladding being a glass comprising $SiO_2$ and further comprising a first additive selected from the group consisting of $TiO_2$ and $ZrO_2$.

2. The optical fiber of claim 1, said cladding further comprising a second additive selected from the group consisting of fluorine and boron.

3. The optical fiber of claim 1, said first additive being $TiO_2$.

4. The optical fiber of claim 3, said cladding consisting essentially of $SiO_2$ and $TiO_2$.

5. The optical fiber of claim 2, said first additive being $TiO_2$.

6. The optical fiber of claim 1, said first additive being $ZrO_2$.

7. The optical fiber of claim 6, said cladding consisting essentially of $SiO_2$ and $ZrO_2$.

8. The optical fiber of claim 2, said first additive being $ZrO_2$.

9. The optical fiber of claim 1, said optical fiber further characterized in that said cladding has a negative value of the thermal coefficient of expansion.

10. The optical fiber of claim 2, said optical fiber further characterized in that said cladding has a negative value of the thermal coefficient of expansion.

11. The optical fiber of claim 1, further comprising:

a region of the optical fiber having a pattern spacing of refractive index change, for use as a Bragg grating.

12. The optical fiber of claim 2, further comprising:

a region of the optical fiber having a pattern spacing of refractive index change, for use as a Bragg grating.

13. A double-cladding optical fiber, comprising:

a core comprising $GeO_2$—$SiO_2$, for guiding light;

an inner cladding surrounding the core and having a refractive index lower than that of the core, said inner cladding being a glass comprising $SiO_2$; and an outer cladding surrounding the inner cladding and having a value of refractive index less than that of the core, said outer cladding being a glass comprising $SiO_2$ and further comprising a first additive selected from the group consisting of $TiO_2$ and $ZrO_2$;

said outer cladding further comprising a second additive selected from the group consisting of fluorine and boron.

14. The optical fiber of claim 13, said first additive being $TiO_2$.

15. The optical fiber of claim 13, said first additive being $ZrO_2$.

16. The optical fiber of claim 13, said optical fiber further characterized in that said outer cladding has a negative value of the thermal coefficient of expansion.

17. A double-cladding optical fiber, comprising:

a core comprising $GeO_2$—$SiO_2$, for guiding light;

an inner cladding surrounding the core and having a refractive index lower than that of the core, said inner cladding being a glass comprising $SiO_2$; and an outer cladding surrounding the inner cladding and having a value of refractive index less than that of the core, said outer cladding being a glass comprising $SiO_2$ and further comprising a first additive selected from the group consisting of $TiO_2$ and $ZrO_2$;

said optical fiber further comprising:

a region of the optical fiber having a pattern spacing of refractive index change, for use as a Bragg grating.

18. The optical fiber of claim 13, further comprising:

a region of the optical fiber having a pattern spacing of refractive index change, for use as a Bragg grating.

19. The optical fiber of claim 13, said outer cladding further having a value of refractive index higher than that of said inner cladding.

20. An optical fiber apparatus, comprising:

an optical fiber having a pattern spacing of refractive index change, said optical fiber comprising:

a core comprising $GeO_2$—$SiO_2$, for guiding light; and an outer cladding surrounding the core and having a value of refractive index lower than that of the core, said outer cladding being a glass comprising $SiO_2$ and further comprising an additive, said additive having a negative value of the thermal coefficient of expansion.

21. The apparatus of claim 20, further comprising:

an inner cladding interposed between said core and outer cladding, said inner cladding having a value of refractive index lower than that of the core, and said inner cladding being made of a glass comprising $SiO_2$.

22. The apparatus of claim 21, said outer cladding further having a value of refractive index higher than that of said inner cladding.

* * * * *